United States Patent [19]
Kato

[11] Patent Number: 5,263,170
[45] Date of Patent: Nov. 16, 1993

[54] MONITOR CIRCUIT FOR DETECTING NOISE CONDITIONS THROUGH INPUT OUTPUT COINCIDENCE COMPARISON

[75] Inventor: Yukio Kato, Sunto, Japan

[73] Assignee: Omron Tateisi Electronics, Co., Kyoto, Japan

[21] Appl. No.: 532,169

[22] Filed: Jun. 1, 1990

Related U.S. Application Data

[63] Continuation of Ser. No. 296,854, Jan. 13, 1989, abandoned, which is a continuation of Ser. No. 829,099, Feb. 14, 1986, abandoned.

[30] Foreign Application Priority Data

Feb. 16, 1985 [JP] Japan .................................. 60-29034

[51] Int. Cl.⁵ ...................... G06F 11/00; G06F 11/30
[52] U.S. Cl. .............................. 395/800; 364/DIG. 2; 364/943.9
[58] Field of Search ................ 364/200, 900, DIG. 1, 364/DIG. 2; 371/3, 15.1, 20.1–20.6, 22.1–22.6, 23, 24, 25.1, 26, 27, 30, 34, 35, 64, 67.1, 71, 1; 324/73 R; 395/200, 250, 275, 325, 575, 750, 800

[56] References Cited

U.S. PATENT DOCUMENTS

| | | | |
|---|---|---|---|
| 3,497,685 | 2/1970 | Stafford et al. | 371/26 |
| 3,609,312 | 9/1971 | Higgin et al. | 364/186 |
| 3,633,016 | 1/1972 | Walker et al. | 371/24 |
| 3,710,350 | 1/1973 | Yoshitake et al. | 364/200 |
| 3,866,171 | 2/1975 | Loshbough | 371/3 |
| 4,159,534 | 6/1979 | Getson, Jr. et al. | 371/71 |
| 4,347,600 | 8/1982 | Abbott et al. | 371/71 |
| 4,376,998 | 3/1983 | Abbott et al. | 371/71 |
| 4,376,999 | 3/1983 | Abbott et al. | 371/71 |
| 4,542,505 | 9/1985 | Binoeder et al. | 371/1 |
| 4,558,447 | 12/1985 | Freeman et al. | 371/71 |
| 4,561,094 | 12/1985 | Jackowski et al. | 371/71 |
| 4,612,638 | 9/1986 | Kissel | 371/20 |
| 4,625,313 | 11/1986 | Springer | 371/20 |
| 4,627,056 | 12/1986 | Awane et al. | 371/20 |
| 4,636,967 | 1/1987 | Bhatt et al. | 364/550 |

FOREIGN PATENT DOCUMENTS

0198170 10/1986 European Pat. Off. .
59-146475 2/1986 Japan .

OTHER PUBLICATIONS

"Logic Card Self-Diagnostic Technique for Driver/Receiver Fault Detection on the Bidirectional Interface to a Remote Data Bus." IBM Technical Disclosure Bulletin, vol. 27, No. 10B (Mar. 1985), pp. 6286–6287.
16-Bit Microprocessor User's Manual, 3rd edition. Tokyo, Prentice-Hall of Japan, 1982. pp. 4, 7, 27–31, 119–122.

*Primary Examiner*—Robert B. Harrell
*Attorney, Agent, or Firm*—Dickstein, Shapiro & Morin

[57] ABSTRACT

A monitor circuit is provided, which includes a data storage unit having dummy data stored therein, a buffer circuit connected to the output of the data storage unit, a coincidence circuit for comparing the data on the I/O bus connected between the buffer circuit and I/O units with the dummy data of the data storage unit, and a flag circuit for setting an abnormal flag responsive to the non-coincidence output from the coincidence circuit. During the I/O refresh of a PC, such an abnormal flag is set in response to a disturbance of the I/O bus. The I/O refresh is repeatedly performed in the event the flag is set.

3 Claims, 4 Drawing Sheets

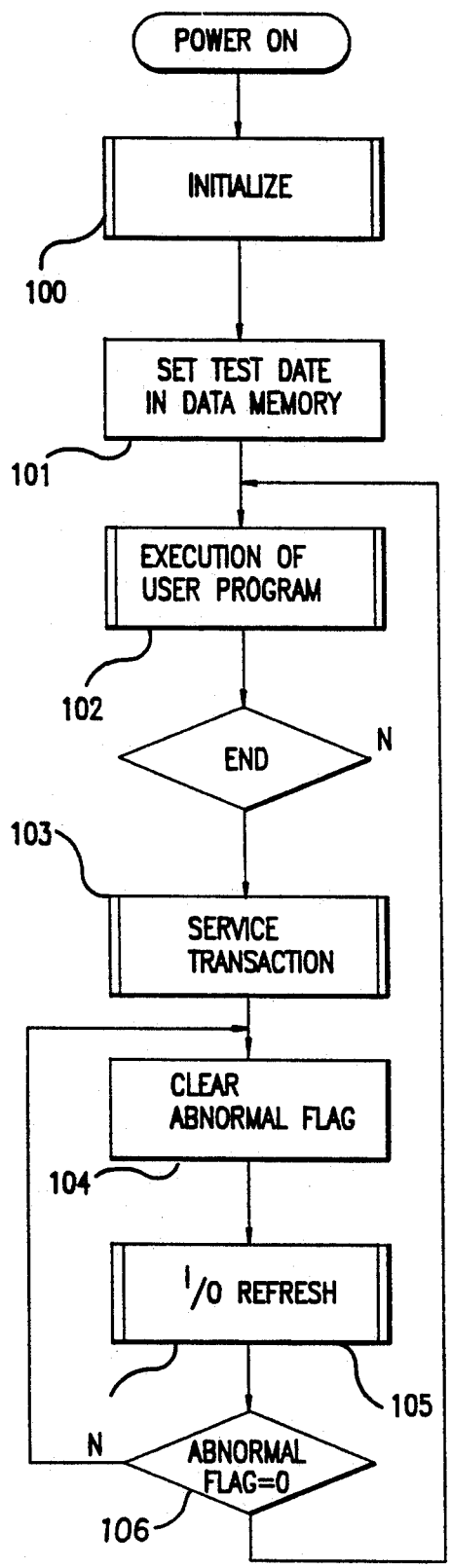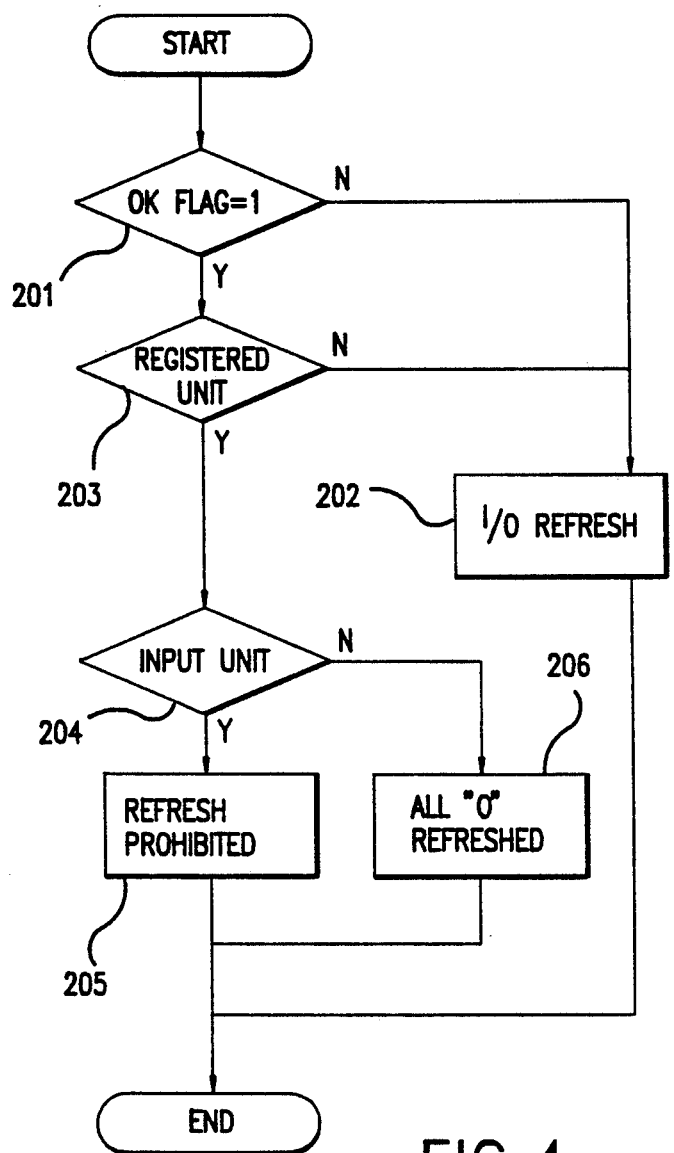
FIG.3
FIG.4

MONITOR CIRCUIT FOR DETECTING NOISE CONDITIONS THROUGH INPUT OUTPUT COINCIDENCE COMPARISON

This application is a continuation of application Ser. No. 07/296,854, filed Jan. 13, 1989, and which is a continuation of Ser. No. 829,099, filed Feb. 14, 1986, both of which are now abandoned.

FIELD OF THE INVENTION

This invention relates to a monitor circuit, and more particularly, to a monitor circuit for use with an input/output bus of a data processing device such as a programmable controller.

BACKGROUND OF THE INVENTION

A programmable controller (PC) normally has a bus gate circuit connected between a data bus of a CPU and an input/output bus connected to input/output units. When accessing the input/output units, the CPU issues an instruction to open the bus gate circuit. The input/output units comprise a plurality of input units and output units. Signal sources such as limit switches, photo electric switches, and proximity switches are connected to the input units and output devices such a motors, electric-magnetic valves, and pumps are connected to the output units.

In this way, the input/output unit functions as an interface connecting the PC to the equipment to be controlled and constitutes the portion which is subject to the worst electric environment in each component of the PC. Accordingly, it is of high importance to design the PC such that the input/output unit and input/output bus are protected against malfunction caused by external noises.

In the event an external noise appears on the input/output bus during the time when the CPU transmits output data to an output unit or receives input data from an input unit, the input/output data may be adversely affected, thus causing malfunction to the PC.

It is well known that such disturbance of the input/output bus takes place during the operation of the PC provided that the input/output unit is attached to or detached from the connector of the input/output bus. Accordingly, the conventional PC has been designed to prohibit the attachment and detachment of the input/output unit during its operation.

However, it would be very convenient if a failed unit can be replaced under the condition in which other units are normally operated.

SUMMARY OF THE INVENTION

It is, therefore, a primary object of this invention to provide a monitor circuit capable of detecting the disturbance of the input/output bus without causing additional burden to a CPU.

According to one aspect of this invention, there is provided a monitor circuit comprising a unit for transmitting dummy data through a buffer circuit to an input/output bus connected to an input/output unit during the time when a bus-gate circuit connected between the input/output bus and a data bus is closed, and a unit for judging whether or not the dummy data are correctly transmitted to the input/output bus under the operation of the transferring unit.

BRIEF DESCRIPTION OF THE DRAWINGS

Other objects and numerous advantages of the monitor circuit according to this invention will be more fully apparent from the following description taken in conjunction with the accompanying drawings in which:

FIG. 3 is a flow chart diagram showing the general operation of the PC of FIG. 1;

FIG. 4 is a detailed flow chart diagram of the input/output refresh step of FIG. 3.

DETAILED DESCRIPTION OF THE PREFERRED EMBODIMENT

Figure 1:
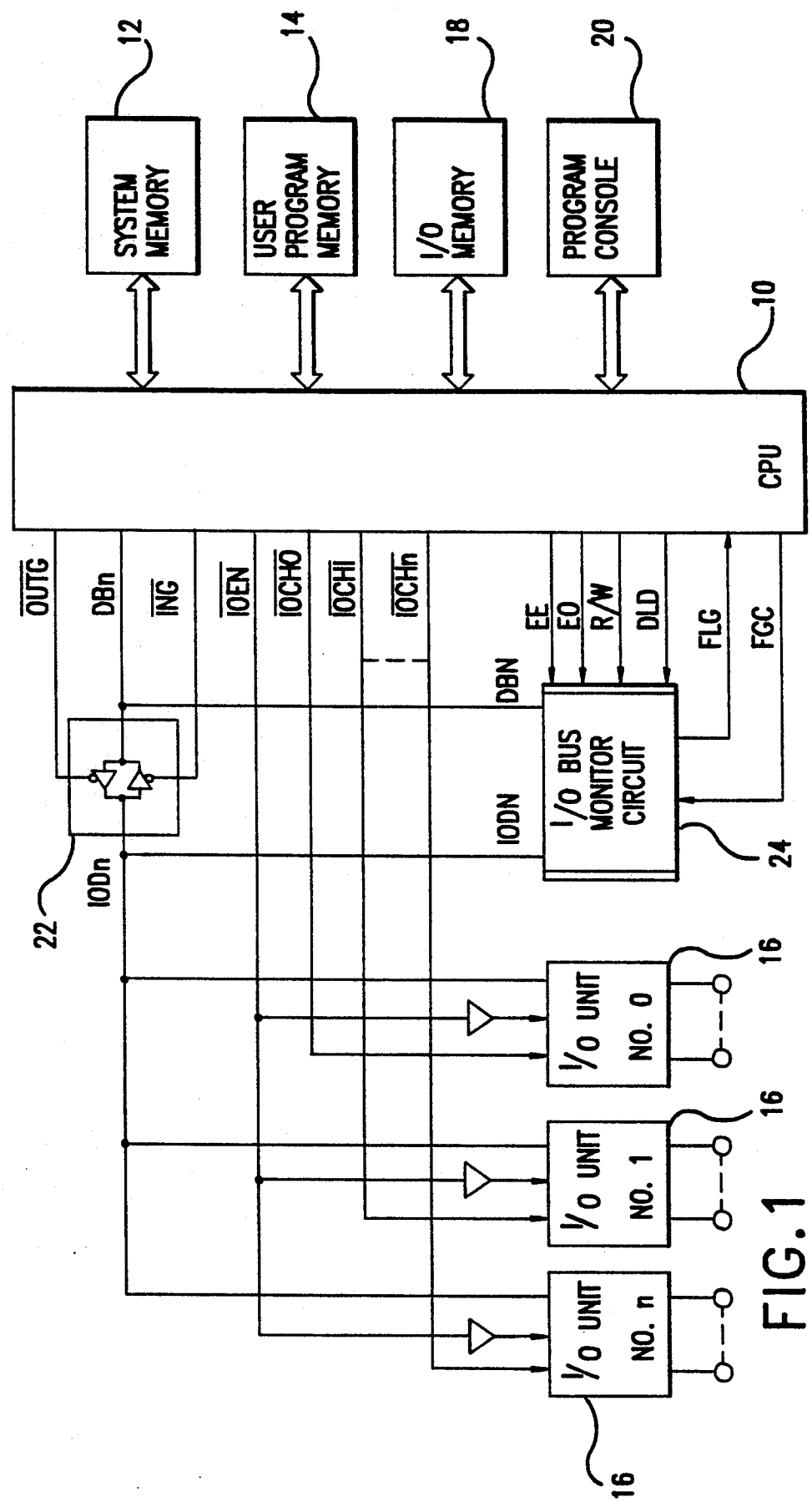
FIG. 1 is a circuit diagram showing the overall construction of a PC in accordance with a preferred embodiment of this invention.

Referring now to FIG. 1, there is shown the overall construction of a PC. A CPU 10 is constituted by a MOTOROLA 6809 unit to which a system memory 12 for storing a system program, user program memory 14, input/output (I/O) memory 18, and program console 20 are connected respectively. Each I/0 unit 16 No. 0 through N functions as either an input or output unit. A bus gate circuit 22 is connected between a data bus DBN connected to CPU 10 and I/0 bus IODN connected to each I/0 unit. A monitor circuit 24 is connected between the output and input of bus gate circuit 22.

Although DBN, IODN, and bus gate circuit 22 are shown to handle only one bit for the purpose of simplification of description, actually they will be provided corresponding to the number of the output terminal of each I/0 unit.

Referring to FIG. 3, the general operation of the PC is illustrated. If the PC is supplied with power from the external a.c. power source by a power switch (not shown), the operation shown in FIG. 3 is initiated. In step 100, each part of the PC is initialized. The next step is also an initialized step which is described hereinafter. In step 102, a user program stored in memory 14 is executed down to its end command based on the data stored in I/0 memory 18 and the output data of I/0 memory 18 is rewritten according to the results of its execution.

The next step 103 is provided to display processing conditions at program console 20 or to receive various instructions therefrom. Then, an abnormal flag FLG of monitor circuit 24 is cleared by a signal FGC (step 104). The next step 105 is provided for I/0 refresh processing. That is, the output data of I/0 memory 18 rewritten by the execution of the user program are transferred to the corresponding output unit 16 and the latest input data of the input unit 16 are taken into the I/0 memory 18 and stored therein.

After completing I/0 refresh processing, an inquiry is made as to whether the abnormal flag FLG is set or cleared (step 106). If the FLG remains cleared, this implies that the I/0 refresh processing has been correctly completed. In this case, a sequence returns to the step 102 which is, as previously described, an execution routine of the user program. If the FLG is set, this implies that a disturbance has been caused to the I/0 bus IODn during the I/0 refresh processing and that the transferred data has probably been changed. In this case, a sequence flows to the step 104 to 105, and the I/0 refresh processing will be retried.

Figure 2:
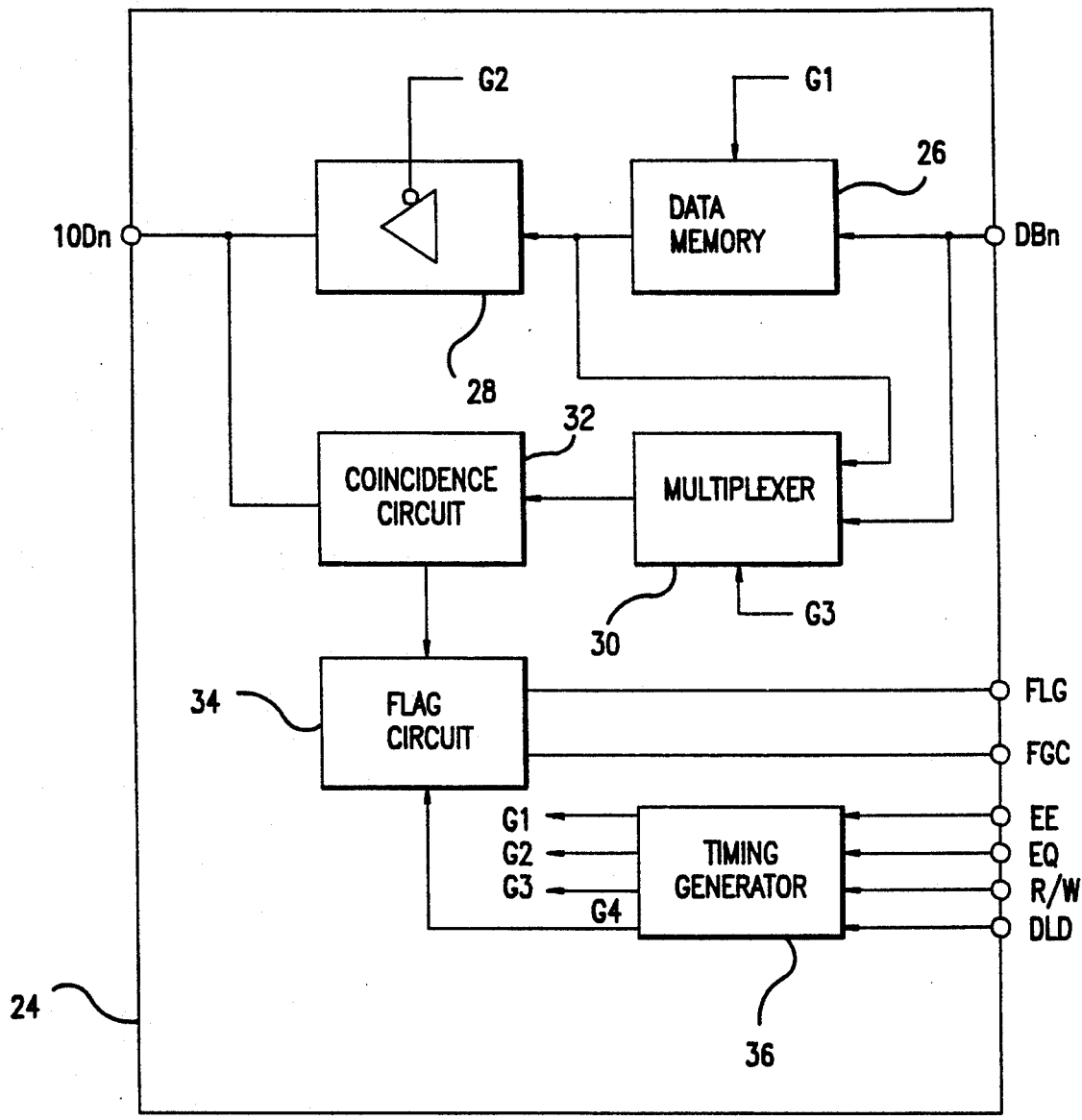
FIG. 2 is a detailed view of a monitor circuit of FIG. 1.

FIG. 2 illustrates detailed construction of monitor circuit 24. The monitor circuit 24 comprises data memory 26 storing a given bit pattern of dummy data, buffer circuit 28 connected between the output of memory 26 and IODn, multiplexer 30 adapted to select either dummy data from memory 26 or the data on CPU data bus DBn, coincidence circuit 32 which compares the data on IODn with the data selected by multiplexer 30 and which provides a coincidence signal or a non-coincidence signal dependent upon whether coincidence between that data exists, flag circuit 34 establishing the abnormal flag FLG responsive to the noncoincidence output from coincidence circuit 32, and timing generator 36 adapted to generate timing signals G1, G2, G3, and G4 based on the system clocks EE and EQ, and control signals R/W and DLD transmitted from CPU 10. The step 101 shown in FIG. 3 is a routine for setting dummy data (test data) into the data memory 26.

Figure 5:
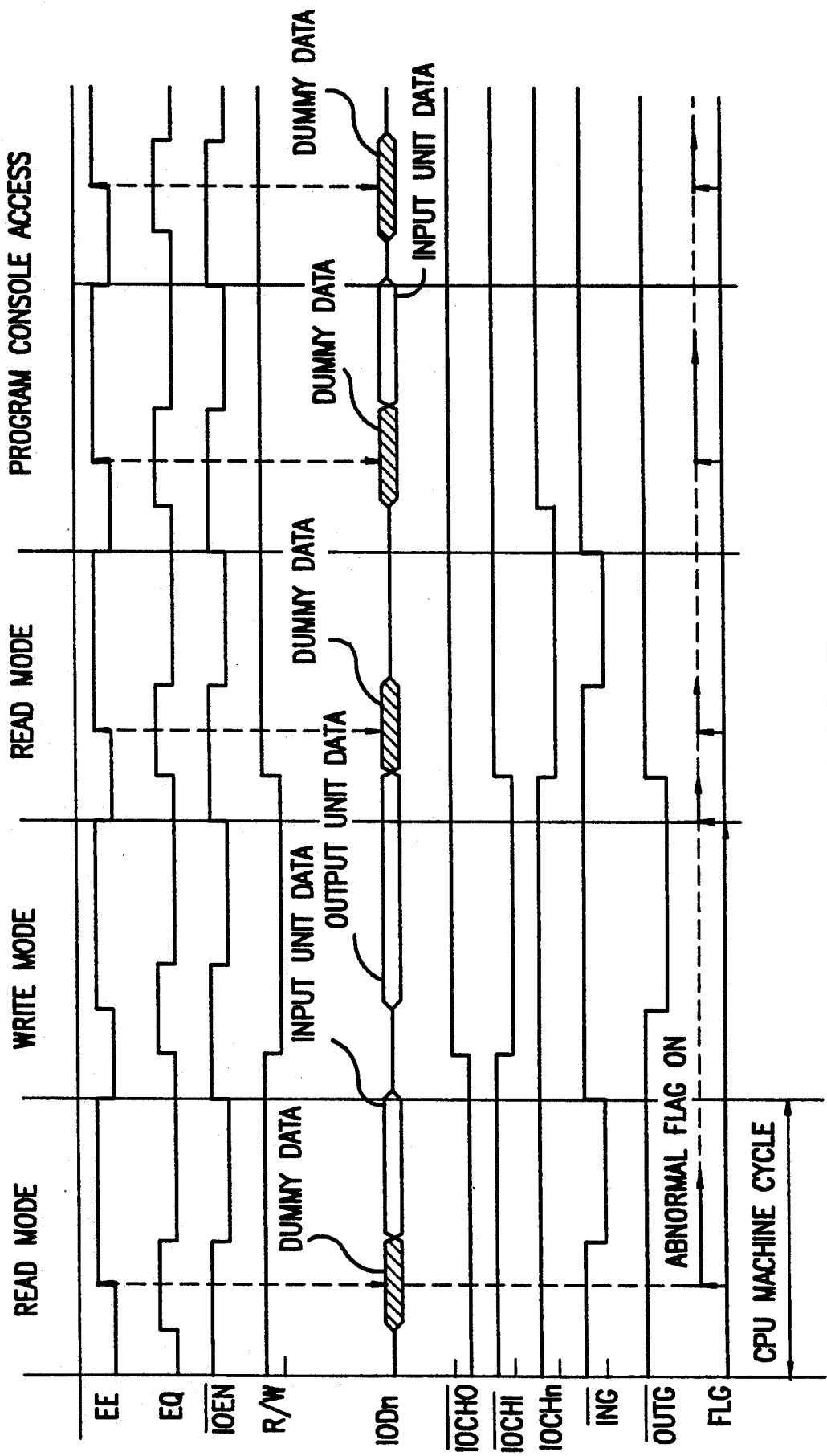
FIG. 5 is a time chart showing the operation of the PC of FIG. 1.

FIG. 5 shows a time chart illustrating the operation of CPU 10 accessing the I/0 units 16 and the operation of monitor circuit 24. An Access Mode (Write Mode) with respect to output units 16 is as follows.

CPU 10 selects by channel select signal IOCHi(i=0 through n) the I/0 unit 16 to be selected and opens the output gate of bus gate circuit 22 by lowering the level of control signal OUTG and then transmits the output data onto data bus DBn. Then, the CPU returns the signal IOEN to its high level subsequent to lowering its level. In this way, the output data on I/0 bus IODn is latched in the selected output unit 16 in synchronization with the rise of IOEN. In this Write Mode, multiplexer 30 of monitor circuit 24 is switched to select the data from DBn and buffer circuit 28 is closed. Accordingly, when CPU 10 transmits the data by opening bus gate circuit 22, the data on IODn is compared with the data on DBn in coincidence circuit 32. Unless a disturbance is caused to IODn, the data on both lines are expected to coincide with each other, while in case such disturbance takes place, there is a possibility of causing non-coincidence between the data. The non-coincidence output of coincidence circuit 32 is read into flag circuit 34 with the rise of signal IOEN.

The Access Mode (Read Mode) with respect to input units 16 is as follows. CPU 10 selects by channel select signals IOCHi the input unit 16 to be accessed, and lowers the levels of signals IOEN and ING in the latter-half portion of a CPU machine cycle. Thus, the input data of the selected input unit 16 is output to IODn, taken into DBn through bus gate circuit 22 and written into I/0 memory 18.

In this Read Mode, multiplexer 30 of monitor circuit 24 is switched to select the dummy data from data memory 26 and buffer circuit 28 is opened immediately before the levels of signals IOEN and ING are lowered. That is, the dummy data of data memory 26 are transmitted through buffer circuit 28 onto IODn immediately before the input gate of bus gate circuit 22 is opened to allow the Read Mode Access. And then, the data on IODn are compared with the data of data memory 26 in coincidence circuit 32. As previously described, unless the disturbance is caused to IODn, the data on both lines are expected to coincide with each other, while in case such disturbance is caused there is a possibility of non-coincidence between the data. The output indicating non-coincidence is read into flag circuit 34 in synchronization with the rise of clock EE.

The monitoring operation of IODn by the use of dummy data is also performed according to the same timing mentioned above when CPU 10 accesses memories 12, 14 and 18 and program console 20.

Thus, in this embodiment, IODn is monitored not only by the use of dummy data when bus gate circuit 22 is closed, but by the use of the output data transmitted from the CPU through DBn by opening gate circuit 22. Accordingly, the frequency of monitoring can be greatly increased, resulting in very little failure to defect disturbances.

In addition to the above mentioned functions, the PC of this embodiment has the following functions which enable previously described attaching and detaching of I/0 units during the operation of the PC.

Prior to the replacement of a failed I/0 unit 16, the unit number of the unit is registered by the use of program console 20. This input data is accepted in step 103 (FIG. 3) and stored in a table (not shown) of system memory 12. Then, a replacement OK flag is set, and "Replacement OK" is displayed in the display of program console 20. The operator of the PC will detach the unit whose number has been registered, and then attach a new unit thereto. Thereafter, the operator will input the completion of the replacement using program console 20. In response to the above operation, CPU 10 will clear the concerned data stored in the table together with the replacement OK flag after confirming the replacement has been normally completed. At the same time "Completion of Replacement" is displayed.

CPU 10 will perform the I/0 refresh in a different manner in case "replacement of unit" has been registered (during the time the replacement OK flag is set). That is, referring to FIG. 4, there is shown a flow chart illustrating detailed substeps of step 105 shown in FIG. 3.

In an inquiry step 201, it is inquired if the replacement OK flag is set. If no, the sequence flows to step 202 in which a normal I/0 refresh is performed. If yes, it is inquired if the number of the accessed unit is registered (step 203). If not registered, the sequence flows to step 202 where a normal I/0 refresh is performed as described above. If registered, it is inquired in an inquiry step 204 if the registered unit is an input unit. In case of an input unit, the performance of I/0 refresh is prohibited to hold the corresponding input data of I/0 memory 18, while in case of an output unit, all "0" data is given to the unit.

In this way, a failed unit can be excluded from the I/0 refresh, in response to the registering operation prior to the replacement of the failed unit. It should be noted that I/0 refresh can be completely performed because the refresh processing is repeatedly performed as previously described in the event the disturbance is caused to the I/0 bus IODn due to the replacement of the failed unit. As a result, the malfunction of a PC can be avoided.

It should be understood that the above description is merely illustrative of this invention and that numerous changes and modifications may be made without departing from the scope of the appended claims.

What is claimed is:

1. A monitor circuit for an input/output bus of a control system, said monitor circuit comprising:
   (a) storage means for storing test data used for testing said input/output bus;
   (b) switching and selecting means for (i) receiving said test data outputted from said storage means and for selectively providing a test data output in a first mode for (ii) receiving data bus output transmitted directly thereto through a data bus and for selectively providing a data bus output in a second mode;

(c) first gate means connected to said storage means and having an output connected to said input/output bus for receiving said test data from said storage means and for selectively transmitting said test data into said input/output bus in said first mode;

(d) second gate means connected to said data bus and said input/output bus for selectively transmitting said data bus output into said input/output bus in said second mode; and (e) coincidence circuit means having one input connected to said switching and selecting means and another input for connection to said input/output bus for (i) comparing in said first mode said test data carried by said input/output bus with said test data stored in said storage means and for providing a coincidence signal upon coincidence of both said test data or providing a non-coincidence signal upon non-coincidence between both said test data or (ii) comparing in said second mode said input/output bus signal with said data bus output transmitted from said switching means and providing a coincidence signal upon non-coincidence of both said data.

2. A monitor circuit according to claim 1 further comprising a judging means which includes flag circuit means connected to said coincidence circuit means for establishing an abnormal flag in response to a non-coincidence signal from said coincidence circuit means.

3. A monitor circuit for comparing input output data coincidence, comprising:

(a) an input/output but connected to a plurality of input/output units;

(b) a data bus connecting said monitor circuit to a central processing unit;

(c) a storage unit for storing test data;

(d) a multiplexer connected to said data bus and said storage unit for receiving test data from said storage unit and data from said data bus;

(e) a buffer circuit connected to said storage unit for receiving said test data from said storage unit;

(f) a bus gate circuit connected to said data bus and said input/output bus for allowing transmission of data bus output into said input/output bus; and (g) a coincidence circuit connected to said multiplexer and said input/out bus such that (i) in a first mode data carried by said input/output bus is compared to a test data stored in said storage unit wherein a coincidence signal is generated upon coincidence of said both input/output bus and test data or a non-coincidence signal upon non-coincidence of both said input/output bus and test data or (ii) in a second mode comparing actual data carried by said input/output bus provided through said bus gate circuit with data bus output data supplied to said coincidence circuit via said multiplexer and generating a coincidence signal upon coincidence of both said actual input/output bus data and data bus output data or generating a non-coincidence signal upon non-coincidence between both said actual input/output bus data and said data bus output data.

* * * * *